United States Patent [19]
Wasson et al.

[11] Patent Number: 5,700,092
[45] Date of Patent: Dec. 23, 1997

[54] INTEGRATED SHAFT SELF-COMPENSATING HYDROSTATIC BEARING

[75] Inventors: Kevin Lee Wasson, Enfield; Alexander Henry Slocum, Concord, both of N.H.

[73] Assignee: Aesop, Inc., Concord, N.H.

[21] Appl. No.: 518,265

[22] Filed: Aug. 23, 1995

Related U.S. Application Data

[63] Continuation-in-part of Ser. No. 237,852, May 4, 1994, abandoned.

[51] Int. Cl.⁶ .................................................... F16C 17/02
[52] U.S. Cl. ........................................... 384/115; 384/120
[58] Field of Search ............................. 384/115, 120, 384/113, 110, 114, 107

[56] References Cited

U.S. PATENT DOCUMENTS

| | | | |
|---|---|---|---|
| 3,747,470 | 7/1973 | Inoue et al. | 364/115 |
| 4,093,323 | 6/1978 | Quandt et al. | 384/115 |
| 4,206,953 | 6/1980 | Diehl et al. | 384/113 |
| 5,271,677 | 12/1993 | Sherman et al. | 384/115 |

*Primary Examiner*—Lenard A. Footland
*Attorney, Agent, or Firm*—Rines and Rines

[57] ABSTRACT

An integrated spindle shaft and the like and self-compensating hydrostatic bearing assembly, obviating the need for external bearing sleeve constructions, in which a cylindrical bearing bore is so provided having circumferential grooves connected to pressure supply and drain systems, and in which collection space pressure supply and fluid drain grooves are provided that cooperate with circumferential collector grooves and pockets, such that when fluid flows axially from the pressure groove areas across the shaft into the collector grooves, in proportion to the radial clearance between the shaft surface and the bore, in conjunction to the pocket opposite to the collector groove, to provide a restoring force in proportion to the radial displacement of the shaft.

21 Claims, 3 Drawing Sheets

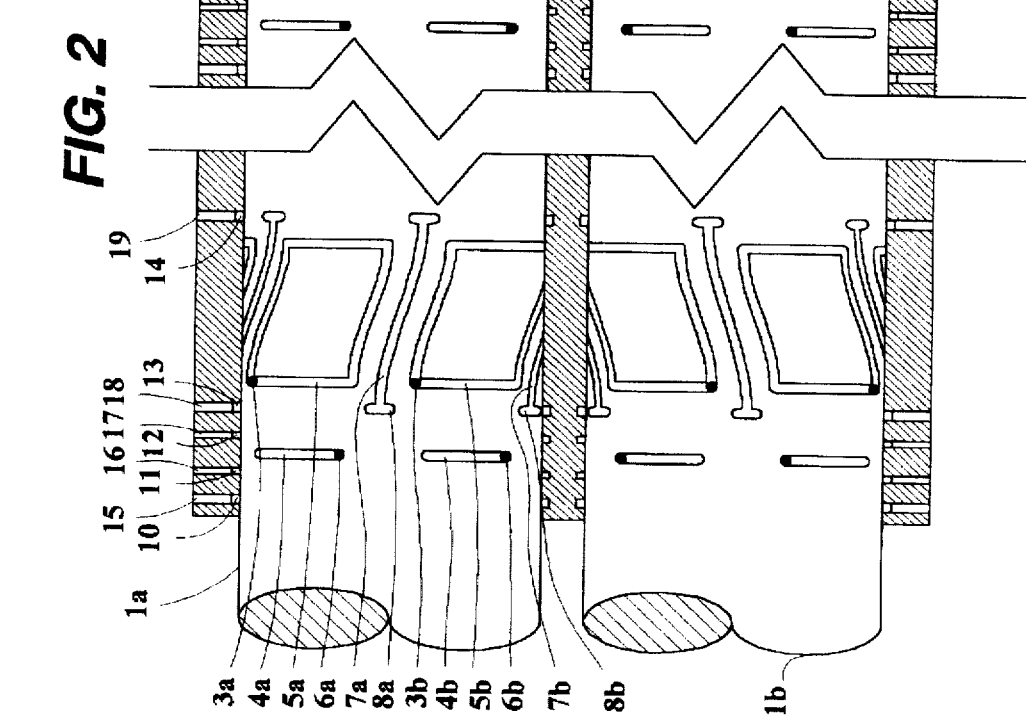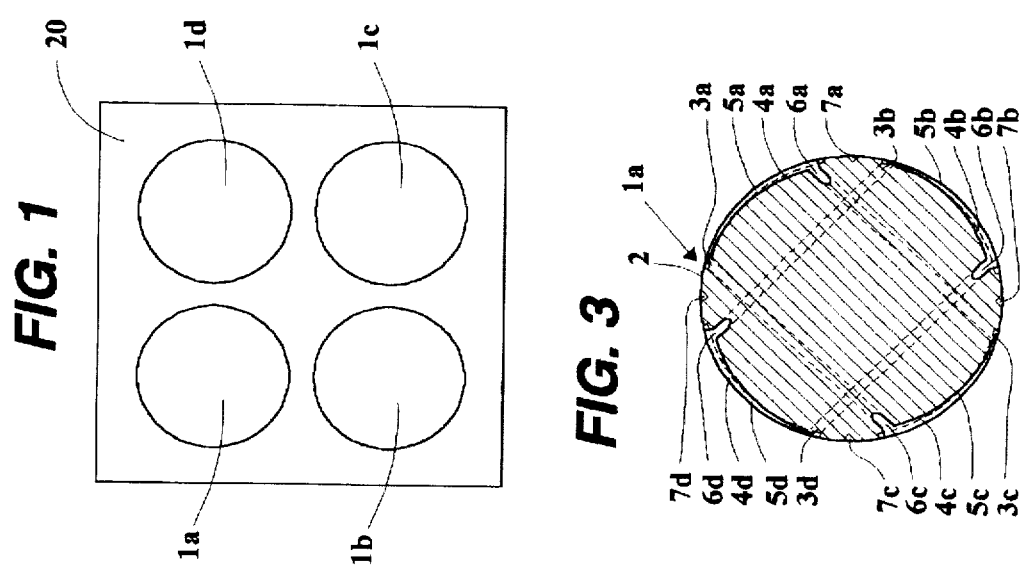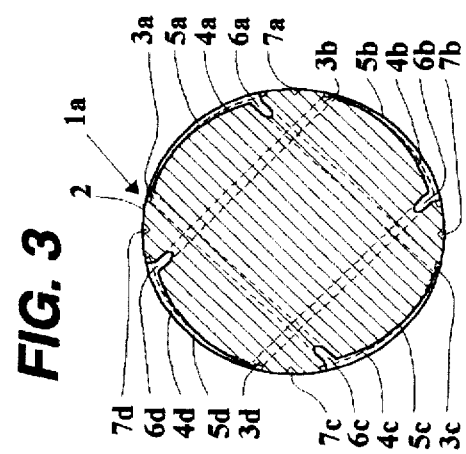

5,700,092

INTEGRATED SHAFT SELF-COMPENSATING HYDROSTATIC BEARING

This application is a continuation-in-part of the parent application Ser. No. 08/237,852 filed May 4, 1994 and abandoned.

The present invention relates to self compensating hydrostatic bearings for the shaft of a spindle or the like, being more particularly directed to self compensating hydrostatic bearing designs that do not require external sleeve mountings to contain the hydrostatic self-compensating fluid logic.

In such and related rotary motion bearing systems, the bearings are supported by a thin film of pressurized fluid-liquid or gaseous-including among other fluids water and air, and hereinafter sometimes generically referred to as "fluid" and interchangeably as "fluidstatic" or hydrostatic bearings.

BACKGROUND

Hydrostatic bearings have been in use for a very long time, and recent improvements in compensator design, such as discussed in U.S. Pat. Nos. 5,164,237, 5,281,032, and U.S. patent application (pending) Ser. No. 209,384 (High Speed Hydrostatic Spindle Design), of common assignee herewith, provide means to allow water (or similar water-derived or related fluids herein also generically referred to as "water") to be used as a working fluid for the bearings. In many cases, the hydrostatic circuitry for attaining such designs for radial bearings for supporting shafts, is contained on the inside and outside diameters of a sleeve that is pressed into a bore of a housing. This is an effective design for many types of spindles, particularly where the greatest accuracy is to be obtained, because a smooth shaft is desired for maximum accuracy in dynamic balancing.

There are, however, many cases, such as cluster spindles (multiple spindle assembly for simultaneous drilling or milling, using tools with a fixed center distance), where there are closely spaced shafts and where the diameter of the shaft is a dominant function of the total system stiffness. In this case, it is desirable not to require a sleeve pressed into a bore of the housing because this decreases the space for the allowable diameter of the shafts.

The present invention, therefore, allows designers to use standard design methods developed for self compensating hydrostatic circuitry, taking advantage of the latest design advancements as disclosed in the above mentioned patents and applications, where the direction of the spindle rotation is primarily in one direction, so the fluid flow into the hydrostatic bearing compensator stars at one end and flows toward the other end (trailing edge) of the collector groove. The fluid is then channeled to the leading edge of the pocket so that it can be evenly dispersed throughout the pocket by the viscous shearing effect of the rotating shaft. In the novel design of the present invention, the collector grooves and the pockets are machined into the surface of the shaft, and then holes are drilled to establish flow channels across chords of the shaft or external shaft surface groove flow diameters are formed to connect corresponding oppositely located collector grooves and pockets. Because the fluid is collected at the training edge of the collector and injected at the leading edge of the pocket, the flow channels on or near the outer regions of the shaft are minimally affected by models centrifugal forces.

More specifically, the invention is concerned with a system that includes a round, cylindrical, or arcuate bearing housing which guides the rotary motion of a round internal coaxial shaft that maintains its distances from the concentric surrounding cylindrical bearing housing surface sections by means of a thin pressurized film of fluid emanating from pockets in either the cylindrical bearing housing surfaces that surround the shaft or in the shaft bearing surfaces and are geometrically opposed to each other at opposing regions thereof. The flow of fluid to the pockets is regulated to allow a differential pressure to exist between the pockets in response to a force being applied to the shaft or bearing housing. The mechanism by which this fluid flow regulation is accomplished involves compensated opposed pocket bearings that behave like two resistances in series with one another and in parallel with another series set. As a force is applied to the shaft or bearing housing, the bearing gap on the side or region to which the force is applied decreases, and the bearing gap on the other side or region increases. The resistance to fluid flow out of the bearing pocket is inversely proportional to the gap dimension. Hence, as the load is applied, the resistance to fluid flow out of the bearing pocket of the load side increases, and decreases out of the bearing pocket of the other side. Also, as in said patents, the resistances to fluid flow into the bearing pockets behave in opposite relation to the resistances to fluid flow out of the bearing pockets; the resistance to fluid flow into the bearing pocket on the load side decreases, and increases into the bearing pocket on the other side. The result is that the pressure increases in the pocket on the side to which the load is applied until the load and the differential pressure generated between the two pockets balance. The beating therefore generates a restoring force and compensates for the applied load. The resistance of the fluid flow into the pockets is herein referred to as compensation.

In the bearings of this application, however, the fluid is routed from the inlet resistance features to the outlet resistance features, either by holes drilled through the housing or shaft to define flow channels and connect these points or grooves formed into the beating surface section are used to provide such flow channels, thus providing a simpler, less costly, and more effective beating.

OBJECT OF THE INVENTION

It is accordingly an object of the present invention to provide new and improved self-compensated hydrostatic bearing circuit designs and to maximize integral shaft diameter in confined spaces by eliminating the need for a pressed-in sleeve that previously was needed to contain the hydrostatic circuitry.

A further objective is to provide self-compensated hydrostatic bearings integrated onto the spindle or other shaft.

Another object of the present invention is to provide a new and improved self-compensating hydrostatic rotary motion bearing and method, void of prior art disadvantages, and that involves novel mechanisms to route the fluid from the inlet compensation resistances to the bearing pockets, whereby a more easily manufactured beating with increased load-carrying capability is produced.

Still an additional object is to provide a novel bearing construction in which the fluid resistance, or compensation, into the bearing pocket is formed by a geometric pattern on the bearing housing surface itself, such that the nominal equilibrium position of the bearing, the resistance of the mechanism will be in desired proportion to the fluid resistance out of the bearing pocket regardless of the magnitude of the nominal equilibrium gap; thereby obtaining an easy-to-manufacture hydrostatic bearing that requires no special hand tuning of its performance.

A further object is to provide an inexpensive modular bearing design that allows machine tool builders to utilize hydrostatic bearings with the same ease that they heretofore have utilized modular rolling element bearings; but because the bearings are hydrostatic, they will attain an order of magnitude increase in performance.

Still a further object is to provide such a novel bearing in which it is insured that all regions of the bearing receive sufficient fluid flow even when the bearing is moving at high speed.

Other and further objects are hereafter explained and more particularly delineated in the appended claims.

SUMMARY

In summary, the invention relates to self-compensating hydrostatic bearing fluid circuitry onto the shaft of a spindle or the like which enables the design to realize a self-compensating hydrostatic bearing design integrated with the spindles that does not require the system to contain the prior art self-compensating hydrostatic circuitry to be formed on the outside diameter of a sleeve, requiring pressing into a bearing bore. Rather, the design of the invention consists of a cylindrical bearing bore with easy to machine circumferential grooves that are each accordingly connected by fluid channel means in or along the shaft to pressure supply and drain systems. The collections of grooves consist typically of two pressure supply grooves spaced a distance apart, typically 10-15 mm apart, and two drain grooves each typically 5 mm axially located from the said pressure supply grooves, and a drain groove typically one shaft diameter axially located from one of the other drain grooves. The sets of grooves are arranged in two sets at each end of said bearing bore to act as fluid supply and fluid drain grooves; and a bearing rotor fits into the bearing bore with a radial clearance that allows for normal shaft deflection, while still allowing for radial bearing gap to provide hydrostatic support action between the bore and the shaft. Circumferential collector groove means are machined or formed into both ends of the surface of the shaft; typically, four grooves equally spaced around the shaft with circumferential arc length on the order of 60 angular degrees, such that when the shaft is placed in the bore, the sets of grooves in the shaft are axially located between the set of two pressure supply grooves. Single or multiple groove pocket shapes are circumferentially spaced and equal in number to the number of collector grooves and axially displaced from the collector grooves, such that the pockets are located between the largely spaced drain grooves in the bore when the shaft is inserted in the bore. Flow channels are provided either by holes drilled in the collector grooves through chords of the shaft traversing the same to connect to one corner of the pocket, or by surface grooves formed along the external shaft surface to traverse the same, such that when fluid flows axially from the pressure grooves across the shaft into the collector grooves, in proportion to the radial clearance between the shaft surface and the bore, it can flow to the pocket opposite to the collector, and thus act to provide a restoring force in proportion to the radial displacement of the shaft.

The invention further embraces in a fluidstatic bearing having opposed bearing surface sections in a cylindrical shaft surrounded concentrically by a cylindrical housing in which the shaft extends coaxially therealong and therebetween, with each bearing surface section having similar and symmetrical pockets and grooves in the surface through which pressure fluid travels to provide a thin film of fluid interposed in the gaps between the shaft and the housing surfaces, apparatus for self-compensating for load variation on either side of the bearing, that comprises, a common pressure annulus from which fluid is fed over a compensation resistance region to a groove flow channel which routes the fluid longitudinally around the shaft on its surface to a pocket, and with the resistance to fluid flow to these grooves being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with a differential pressure being established in the opposite pockets to compensate for such applied load.

The self-compensating bearings are thus integrated into the shaft itself.

Preferred and best mode designs and techniques are hereinafter described.

DRAWINGS

The invention will now be described with reference to the accompanying drawings in which:

FIG. 1 is an end view of a spindle assembly, showing the housing and four spindles that form a cluster;

FIG. 2 is a cross section through the cluster assembly using flow channels along chords within the shaft connecting oppositely located collector and pocket grooves;

FIG. 3 is a cross section through one of the shafts;

Figure 6:
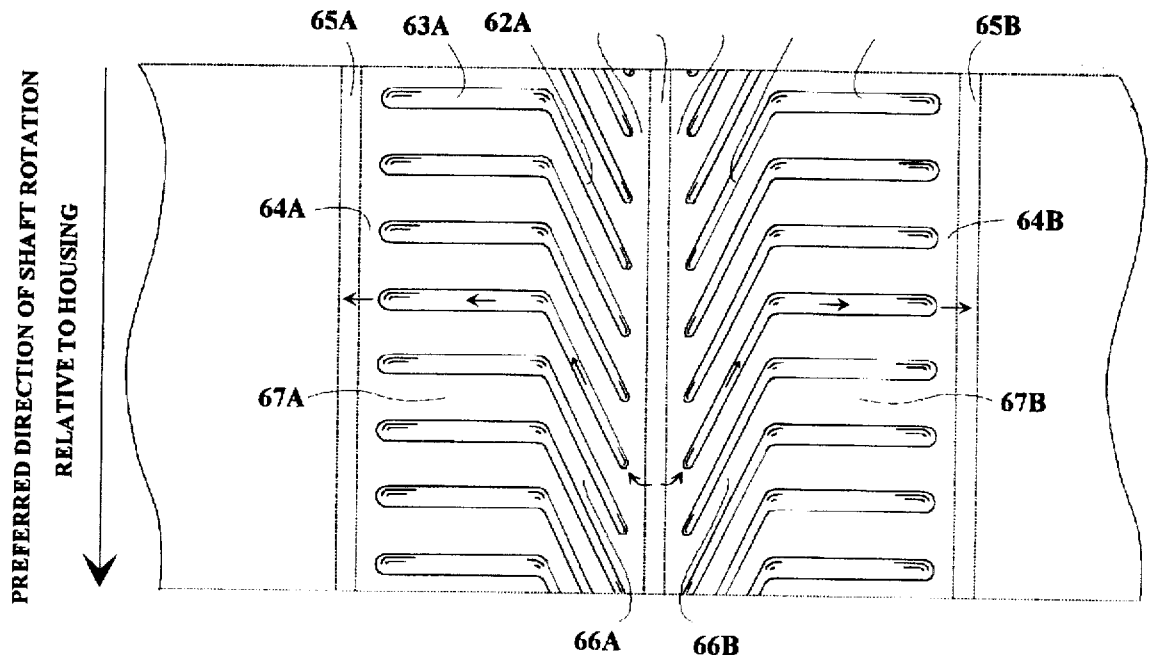
Figure 7:
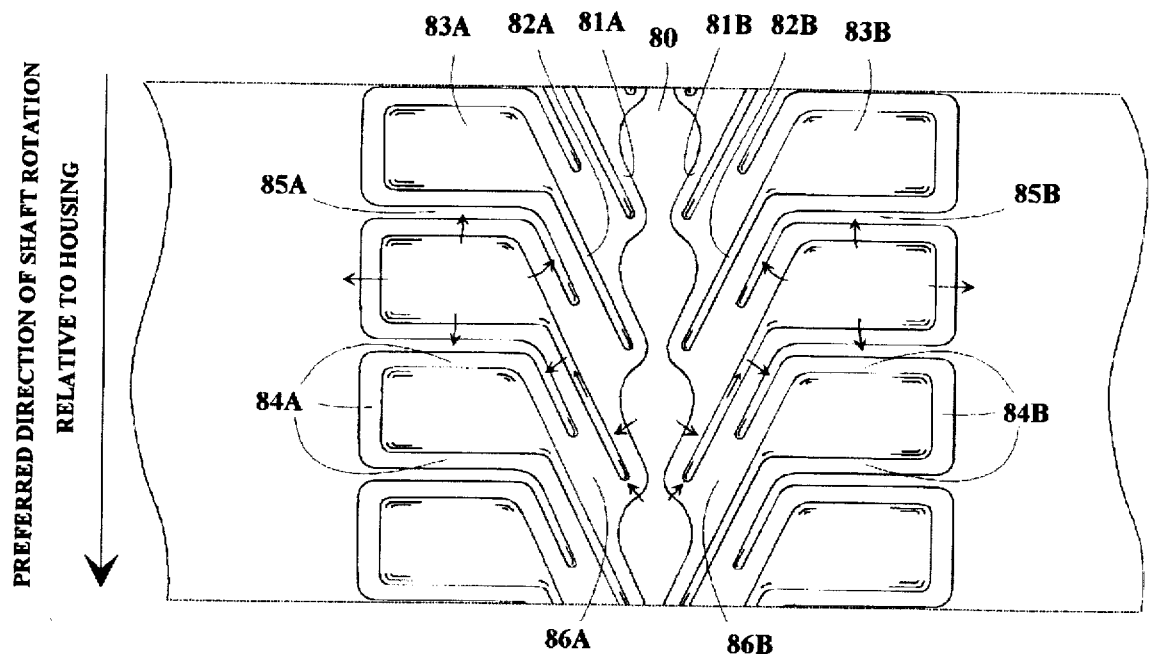

FIG. 6 is a flat projection (unwrapped) of the arcuate cylindrical surface sections of a modified bearing with pockets which have the same order-of-magnitude width as the fluid distribution pockets; and FIG. 7 is a flat projection (unwrapped) of the arcuate cylindrical surface sections of a further modified bearing with drainage grooves between the pockets so as to prevent circumferential leakage flow between the pockets.

PREFERRED EMBODIMENT OF THE INVENTION

In general, as before explained, a precision hydrostatic bearing supported spindle is manufactured by placing a smooth rough shaft into a bearing bore that either contains pockets machined into the bore, or sleeves that contain the pockets and hydrostatic circuitry that is pressed into the bore.

As shown in FIG. 1, several spindles often need to be located in close proximity and a fixed distance from each other. Here, a housing 20 is shown containing multiple spindle shafts 1a, 1b, 1c, and 1d therein. These spindles may be used, for example, to bore or drill fixed spacing holes in a part. Such applications are extremely common in the automotive industry. Unfortunately, because the stiffness of a shaft is proportional to the fourth power of the shaft diameter, it is extremely important to be able to maximize the shaft diameter in a cluster spindle.

In the novel design of the invention that is presented here, instead of using a sleeve, circumferential collector grooves 4a, 4b, 4c, and 4d are integrally machined into surfaces at both ends of the shaft 1a (and correspondingly into all the other shafts) as shown in FIGS. 2 and 3. Typically, four grooves are equally spaced around the shaft with circumferential arc length on the order of 60 angular degrees, such that when the shaft is placed in the bore of the housing 20, sets of collector grooves are axially located between sets of two pressure supply grooves 11 and 12. How is then regulated to the collector grooves according to the load and resulting gap changes between the shaft and the bore. Flow from the pressure supply grooves 11 and 12 is contained by leakage across the tight shaft-bore gap into drain grooves 10 and 13. Drain groove 14 acts to drain fluid from the other end of the bearing. Radial holes 15, 16, 17, 18, and 19 connect the drain and pressure grooves to external sources, as is well known to those skilled in the art.

To support the load, the pressure compensated fluid collected in the collectors 4a, 4b, 4c, and 4d, has to be taken to the corresponding opposed pockets 5c, 5d, 5a, and 5b, respectively. This is done via holes 6a, 6b, 6c, and 6d in the ends of the collectors 4a, 4b, 4c, and 4d which are tangentially aligned with respect to the shaft surface and define routing flow channels traversing the shaft from points on the circumference of the shaft to displaced or opposing circumferential points. As shown, the channels between the opposing points are directed internally along routing hollow chords of the shaft at an axially inclined angle to the shaft until they intersect with the leading corner edge 3a, 3b, 3c, and 3d of the pockets 5c, 5d, 5a, and 5b, respectively. When fluid flows axially from the pressure grooves 11 and 12 across the shaft into the collector grooves 4a, 4b, 4c, and 4d, in proportion to the radial clearance between the surface of the shaft 1a and the bore in the housing 20, it can flow to the pocket opposite to the collector, and thus act to provide a restoring force in proportion to the radial displacement of the shaft. Because the fluid is collected at the training edge of the collector and injected at the leading edge of the pocket, the holes from the collectors to the pockets stay near the outer regions of the shaft and are minimally affected by modest centrifugal forces.

FIG. 2 exemplarily shows the pockets in a preferenced rhombus shape, as taught in the before described patent application. Between the pockets are helical axial drain grooves 7a, 7b, 7c, and 7d that maximize pocket pressure differentials and hence also the load capacity and stiffness. To avoid having to cut circumferential grooves in the shaft at the ends of the drain grooves, which would decrease shaft stiffness, the ends of the helical axial drain grooves have short circumferential segments 8a, 8b, 8c, and 8d which help to couple the drain groove ends to the circumferential drain grooves 13 and 14 in the bore of the housing 20.

Although not necessary, it can be beneficial from a turbulence and cavitation reduction perspective, to make the collector grooves 4a, 4b, 4c, and 4d, FIG. 3, tapered along their length from a fraction of a millimeter starting depth to a depth of several millimeters. The holes 6a, 6b, 6c, and 6d that connect the collectors to the opposing pockets are located at the deep ends of the collectors, such that as the fluid flow rate into the collector increases, more room is provided for it with less danger of cavitation; and at the end, it is encouraged by the inclined hole to flow into the hole and chordially across said shaft into the leading edge of the pockets. Furthermore, with this system, in which the holes from the collectors to the pockets intersect the pockets at their leading edges with respect to the direction of fluid flow induced by shaft rotation, the fluid flow is carried across the circumferential width of the pockets as the shaft rotates, thereby making sure that cavitation, foaming, and erosion are minimized, and the pocket receives a more even distribution of pressure.

A further significant advantage of this design is that the passages can easily be cleaned simply by removing the shaft. In a design where the passages are in an annulus between the sleeve and the housing, the passages can only be cleaned with the use of a high pressure solvent. In both cases, however, the nature of the self compensating gap to act as a filter will prevent any large particles from causing an unremovable obstruction.

The drawings thus illustrate apparatus for supporting a cylindrical shaft using a pressurized thin film to provide accurate motion capability. To maximize versatility, it is desired to provide modular cylindrical bearing housings; and to provide accurate rotary motion, at least four degrees of freedom must be restrained. Two of the four degrees of freedom are translational, and two of the degrees of freedom are angular (tilt). To maximize resistance to tilt motions, the cylindrical bearings would be spaced axially along the shaft. Alternatively, a single rotational bearing may be combined with a thrust bearing that will resist the tilt motions. The latter option will result in the formation of a very accurate rotary table. The former option combined with a pure thrust bearing, which may also be self-compensating, will result in the formation of an accurate spindle for use, for example, in machine tools and grinding machines and the like.

Figure 4:
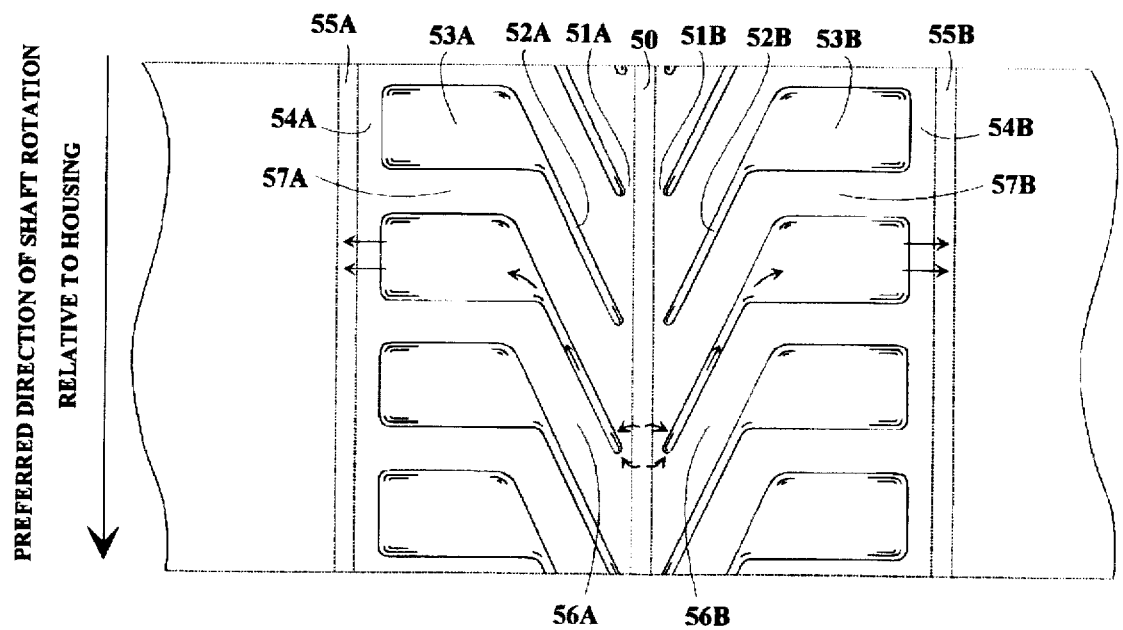
FIG. 4 is a flat projection (unwrapped) of the arcuate cylindrical surface sections of a bearing constructed in accordance with the present invention, illustrating the compensation resistance regions, fluid distribution grooves, and pockets and the use of flow channel grooves on the external surface of the shaft to connect collector grooves and pockets.
Figure 5:
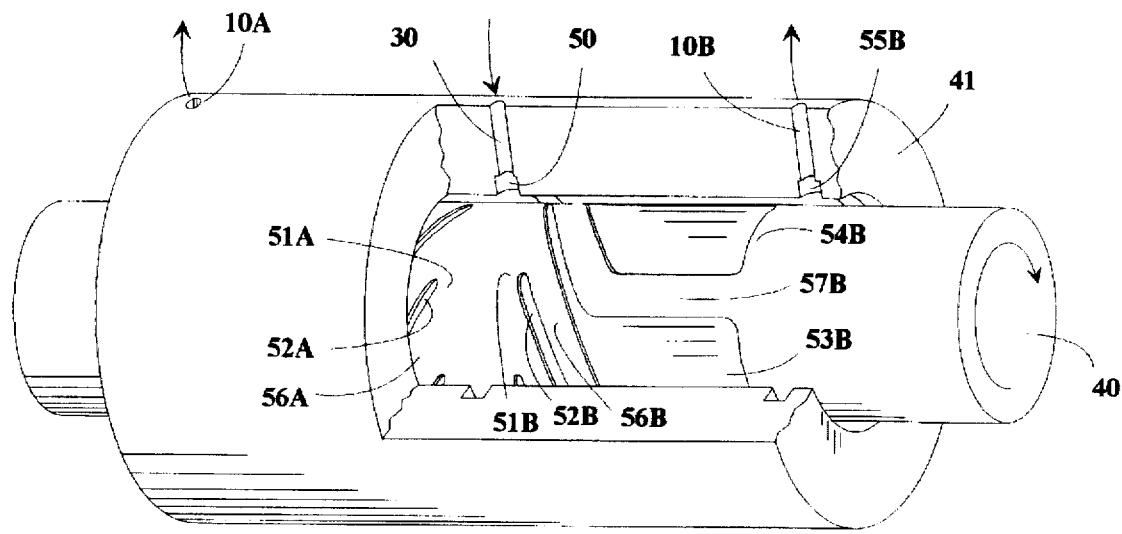
FIG. 5 is a partial isometric view of the bearing system of FIG. 4 which, for the purpose of clarity, has an exaggerated gap between the shaft and housing, and a section of the housing cut away to reveal the geometry on the surface of the shaft.

As before stated, a less costly and more efficient construction than using the type of internal collector-to-pocket channels for chordally traversing the shaft, flow channels 6a, 6b, etc. may be provided by locating the flow channels on the external surface of the shaft to traverse the same as shown at 52A, 52B, etc. in the embodiment of FIGS. 4 and 5, as 62A in FIG. 6, and as 82A, 82B in the modification of FIG. 7.

As shown in FIG. 5, a cylindrical shaft 40 of the invention moves coaxially inside a concentric outer cylindrical bearing housing 41 (partially cut away in the figure to show more clearly the grooves and pockets in the shaft). The motion of the shaft 40 about (or along) the horizontal or X axis is guided by arcuate or cylindrical (or portions of a cylinder herein termed cylindrical) longitudinally extending bearing pad surface section 53B, of which there can be multitude but at least three. As it is implied in FIG. 5 that the shaft is symmetric with respect to a plane prescribing the fluid supply channel 50 and whose normal vector is parallel and concentric with the axially-extending centerline of the shaft 40, similar longitudinally extending bearing pad surface sections are hidden by the housing 41 and not shown in this parametric representation. By using two bearings on the same shaft, moments about the two axes perpendicular to the shaft centerline are resisted. However, a spindle could also be constructed with a single bearing of the type described here in conjunction with two thrust bearings that provide moment resistance.

In FIG. 5, fluid enters the bearing at high pressure through a hole drilled radially through the housing 41 and into the supply pressure annulus 50. Since the dimensions of the annulus 50 are large compared with the other flow dimensions of the bearing, the fluid flows freely circumferentially through the annulus 50 to create a region of uniformly high pressure.

As more particularly shown in the unwrapped-view of FIG. 4, the fluid then flows axially across the compensation resistance regions 51A and 51B to the fluid routing flow channel grooves 52A and 52B, formed in the external surface of the shaft rather than traversing chordally internally through the shaft as in FIGS. 2 and 3, before-described, and whose depth radially into the shaft is large (by at least a factor of about 5) compared with the clearance between the shaft 40 and the housing 41. If so dimensioned, the fluid will flow freely to the bearing pocket regions 53A and 53B whose depths are comparable to that of the grooves 52A and 52B so as to provide regions of relatively uniform pressure. Leakage reduction regions 56A, 56B, 57A, and 57B are at a small distance radially from the inner surface of the bearing housing 41 (typically 0.01 mm to 0.03 mm). This region acts to substantially reduce leakage flow circumferentially between the routing groves 52A and 52B, and circumferentially between the pockets 53A and 53B. The flow leaves the bearing pockets 53A and 53B across the pocket resistance regions 54A and 54B and into the fluid collection annuli 55A and 55B, whose dimensions are similar to those of the supply pressure annulus 50. After freely flow circumferentially through the fluid collection annuli 55A and 55B, the fluid exits the bearing to low pressure (typically atmospheric pressure) through holes 10A and 10B drilled radially through the housing 41.

The flow channel routing grooves 52A and 52B are typically dimensioned to extend between 90 degrees and 180 degrees around the shaft with respect to the centers of the pockets 53A and 53B. They are so dimensioned using fluid flow resistance calculations methods known to those skilled in the art to obtain a different response of the compensation resistance regions 51A and 51B compared to the pocket resistance regions 54A and 54B as the shaft is moved out of concentricity by a load applied to the shaft or housing. The changes in the resistances of the compensation regions 51A and 51B and the resistances of the pocket regions 54A and 54B will induce a pressure differential between the pocket regions 53A and 53B that are on opposite sides of the shaft longitudinally to create a restoring force to counter the applied load, as earlier described. The improvement in this modification is the use of external shaft flow channel routing grooves 52A and 52B.

The drawing of FIG. 5 indicates that the pockets 53A and 53B and flow channel routing grooves 52A and 52B are machined or otherwise formed into the surface of the shaft 40 (such as by casting or molding, if appropriate slab materials are used). This is done for ease of manufacture. The effect intended by the present invention could also be achieved by machining or otherwise forming the pockets 53A and 53B and flow channel routing grooves 52A and 52B into the inner surface of the bearing housing 41, if desired.

Shown in FIG. 6 is a bearing similar to that previously described except the pockets have been reduced in dimension to such an extent that their width is comparable to the width of the routing grooves and shown in an obtuse angle relative relationship. Since this design invites the use of a plurality or plethora of inherently parallel grooves and pockets, in many bearing applications it can be designed to have higher load capacity than the bearing of FIG. 4, and since it has a plurality of pockets, it will obtain more precise rotary motion than the bearing of FIG. 4. After entering the fluid supply pressure annulus 60, the fluid flows axially across the compensation resistance regions 61A and 61B to the fluid routing flow channel grooves 62A and 62B, whose depth radially into the shaft is large (by at least a factor of 5) compared with the clearance between the shaft 40 and the housing 41. If so dimensioned the fluid will flow freely to the bearing pocket regions 63A and 63B whose depths are comparable to that of the flow channel grooves 62A and 62B so as to provide regions of relatively uniform pressure. Leakage reduction regions 66A, 66B, 67A, and 67B are at a small distance radially from the inner surface of the bearing housing 41 (typically 0.01 mm to 0.03 mm). This region acts to substantially reduce leakage flow from circumferentially between the routing grooves 62A and 62B, and circumferentially between the pockets 63A and 63B. The flow leaves the bearing pockets 63A and 63B across the pocket resistance regions 64A and 64B and into the fluid collection annuli 65A and 65B, whose dimensions are similar to those of the supply pressure annulus 60. After freely flowing circumferentially through the fluid collection annuli 65A and 65B, the fluid exits the bearing to low pressure (typically atmospheric pressure) through holes 10A and 10B drilled radially through the housing 41.

Shown in FIG. 7 is a bearing similar to those previously described except drainage grooves have been added between the pockets, and the shape of the supply pressure annulus has been changed. The supply pressure annulus 80 has been shaped so as to reduce the flow resistance to the routing flow channel grooves 82A and 82B, and in this case would preferably be machined into the shaft if the pockets are machined into the shaft or into the housing if the pockets are machined into the housing. The drainage grooves 85A and 85B have been included between the pocket resistance regions 84A and 84B to eliminate circumferential fluid flow between the pockets that acts to reduce the load-carrying capacity of the bearing. Adding the drainage grooves 85A and 85B increases the flow rate of the fluid through the bearing, which can help to cool the bearing when it is operated at high rates of rotational speed. After entering the fluid supply annulus 80, the fluid flows axially across the compensation resistance regions 81A and 81B to the fluid routing grooves 82A and 82B, whose depth radially into the shaft is large (by at least a factor of 5) compared with the clearance between the shaft 40 and the housing 41. If so dimensioned the fluid will flow freely to the beating pocket regions 83A and 83B whose depths are comparable to that of the grooves 82A and 82B so as to provide regions of relatively uniform pressure. Leakage reduction regions 86A and 86B are at a small distance radially from the inner surface of the bearing housing 41 (typically 0.01 mm to 0.03 mm). These regions act to substantially reduce leakage flow circumferentially between the routing grooves 82A and 82B. The flow leaves the bearing pockets 83A and 83B across the pocket resistance regions 84A and 84B and into the drainage regions 85A and 85B, where the pressure is low (typically atmospheric pressure). The fluid may then be fed similarly to the previously described bearings to fluid collection annuli and out of the beating.

FIGS. 4–7 show the preferred direction of shaft rotation for the bearings contained in this application. The movement of the shaft relative to the housing induces a flow of fluid generally in a circumferential direction and induces a gradient in pressure from the entrance of, for example, the flow channel routing grooves 52A and 52B to the exit of the pockets 53A and 53B, the pressure being lowest at the entrance of the routing grooves and highest at the trailing edges of the pockets. The bearing has been so designed that, when the shaft is rotated in this direction at a high rate of rotational speed, the lowest pressure in the bearing will occur at the entrance of the routing grooves 52A and 52B. Since these regions are near the supply annulus 80 where the fluid remains at a high pressure, the pressure of the fluid in the routing grooves 52A and 52B will remain high even at very high rotation rates. If the shaft is rotated at high speed in the direction opposite the preferred direction of rotation, then the areas in which the pressure is highest and lowest as just described will reverse and cavitation is likely to occur in the pockets 53A and 53B.

In all descriptions of the invention it has been stated that the motion of the shaft 40 with respect to the housing 41 is in a circumferential direction, so as to achieve rotary motion. The invention described herein, however, works equally well when the motion of the shaft 40 with respect to the housing 41 is in an axial direction, so as to achieve linear motion. In fact the present invention can be used to replace rolling element bushings to obtain a substantial increase in precision guiding performance in applications where the guide rails are cylindrical or arcuate in geometry.

In summary, the objectives of the invention are thus attained, generally, in a mechanism providing smooth accurate rotary motion by means of one or more bearing pad pairs which guide the motion of a shaft 40 about and/or along an axis. The bearings are kept from making mechanical contact with the housing 41 by the thin film of pressurized fluid that flows from sets of opposed recess pockets in selected cylindrical surfaces of the shaft 40 that are surrounded by the housing 41. The flow of fluid to the pockets is regulated along novel flow channels to allow a differential pressure to be established between the pockets, thereby compensating for changes in applied loads to the housing. This fluid flow regulation is provided by applying pressurized fluid in the annular recess grooves from which fluid flows to across respective compensation resistance regions to pockets in which the differential pressures are generated to provide load restoring capacity.

Further modifications of the invention will also occur to persons skilled in the art, and all such are deemed to fall within the spirit and scope of the invention as defined by the appended claims.

What is claimed is:

1. A self compensating hydrostatic bearing for shafts having, in combination, a cylindrical bearing bore provided with a plurality of circumferential grooves, each connected by radial hole means to pressure supply and drain systems; said grooves comprising pressure supply grooves and drain grooves axially spaced from the pressure supply grooves, and arranged in said bearing bore to serve as fluid supply and fluid drain grooves; a bearing shaft fitted into said bearing bore with a radial clearance that allows for normal shaft deflection and for a radial bearing gap for hydrostatic support action between the said bore and the said shaft; circumferential collector groove means on the surface of said shaft, comprising a plurality of grooves equally spaced around the shaft, such that when the shaft is placed in the bore, the collector grooves in the shaft are axially adjacent to the pressure supply grooves; pockets circumferentially spaced and equal in number, and axially displaced from said collector grooves such that the pockets are located between the drain grooves in said bore when said shaft is inserted therein; flow channels traversing the shaft to connect the collector grooves to the pockets and route the fluid therealong, such that when the fluid flows axially from said pressure grooves across the shaft into said collector grooves, in proportion to the radial clearance between the surface of said shaft and said bore, it can flow to the pocket opposite to the collector, and thus act to provide a restoring force in proportion to the radial displacement of the shaft.

2. The bearing of claim 1 and in which the shaft comprises a spindle rotatable within the cylindrical bearing bore.

3. The bearing of claim 2 and in which the flow channels are formed internally of the shaft to connect the collector grooves to the pockets and route the fluid therebetween.

4. The bearing of claim 3 and in which the flow channels are along chords of the shaft.

5. The bearing of claim 2 and in which the flow channels are formed as routing grooves along the external surface of the shaft to connect the collector grooves to the pockets and route the fluid therebetween.

6. The bearing of claim 5 and in which depths of the routing grooves is large compared to said bearing gap.

7. The bearing of claim 6 and in which the groove depth is at least five times the dimensions of the said gap.

8. The bearing of claim 5 and in which the pockets are of width substantially comparable to that of the routing grooves.

9. The bearing of claim 8 and in which a plurality of pocket-routing grooves are employed.

10. The bearing of claim 9 and in which the routing grooves extend at an obtuse angle to the product grooves.

11. The bearing of claim 10 and in which the pocket-routing grooves are substantially parallel to one another.

12. The bearing of claim 5 and in which the pockets and the routing grooves are formed in the inner surface of the cylindrical bearing bore.

13. The bearing of claim 5 and in which drainage grooves are disposed extending between adjacent pockets.

14. The bearing of claim 2 and in which the circumferential collector grooves at the ends of the surface of the shaft are of circumferential arc length on the order of 60 degrees.

15. The bearing of claim 2 and in which the grooves of the plurality of circumferential grooves comprise a pair of spaced pressure supply grooves and a pair of drain grooves axially spaced from the pressure supply grooves.

16. The bearing of claim 15 and in which the collector grooves in the shaft are axially located between the pair of pressure supply grooves.

17. The bearing of claim 2 and in which said pocket is comprised of a groove in the shape of a rectangle or a rhombus that surrounds a central land region at the same diameter as the shaft.

18. The bearing of claim 2 and in which said flow channel from said collector to said pocket intersects said pocket at its leading edge with respect to the direction of fluid flow induced by shaft rotation, such that the fluid flow is carried across the circumferential width of said pocket as the shaft rotates, thereby ensuring that cavitation, foaming, and erosion are minimized, and the pocket receives a more even distribution of pressure.

19. The bearing of claim 2 and in which said pockets are separated circumferentially by axial drain grooves between the pockets, formed into the surface of said shaft and with the ends of said drain grooves having short circumferential regions that circumferentially taper off of the end of the grooves, better to couple the flow of said grooves into the circumferential drain grooves in the said bore.

20. The bearing of claim 2 and in which the collector grooves taper from a fraction of about a mm starting depth, to a depth of several millimeters.

21. The bearing of claim 1 and in which the shaft is movable axially within and along the cylindrical beating bore.

* * * * *